Figure 4:
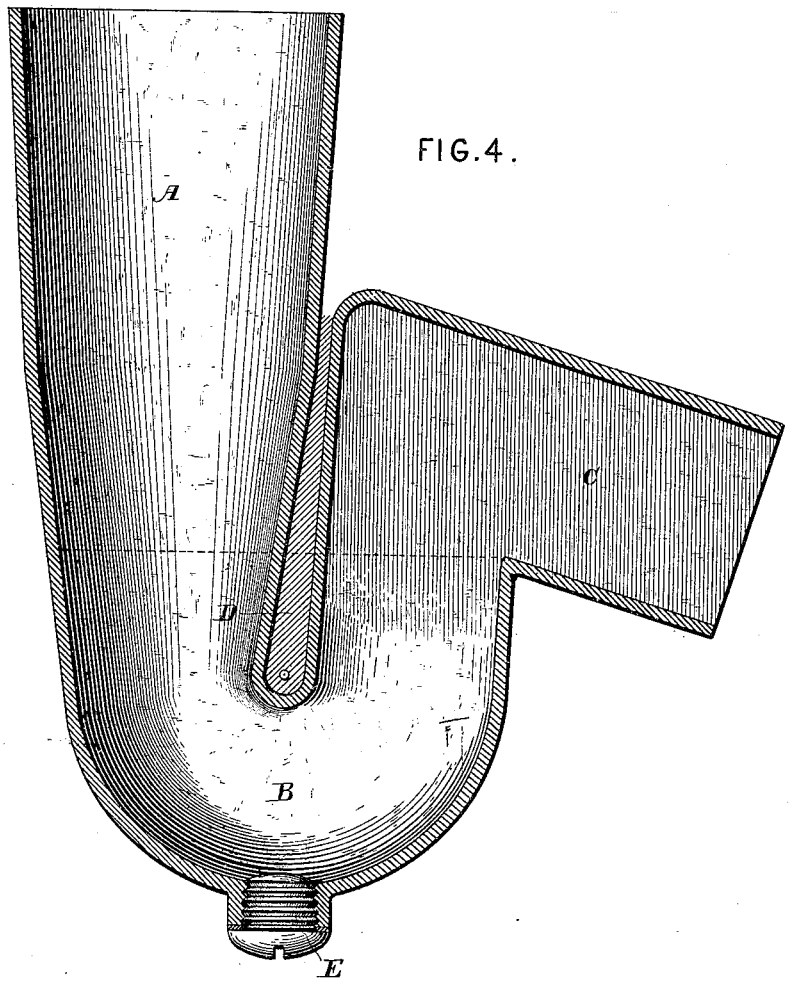

(No Model.) 2 Sheets—Sheet 1.
S. S. HELLYER.
TRAP FOR SOIL AND OTHER PIPES.
No. 329,388. Patented Oct. 27, 1885.
FIG.1.
FIG.3.*
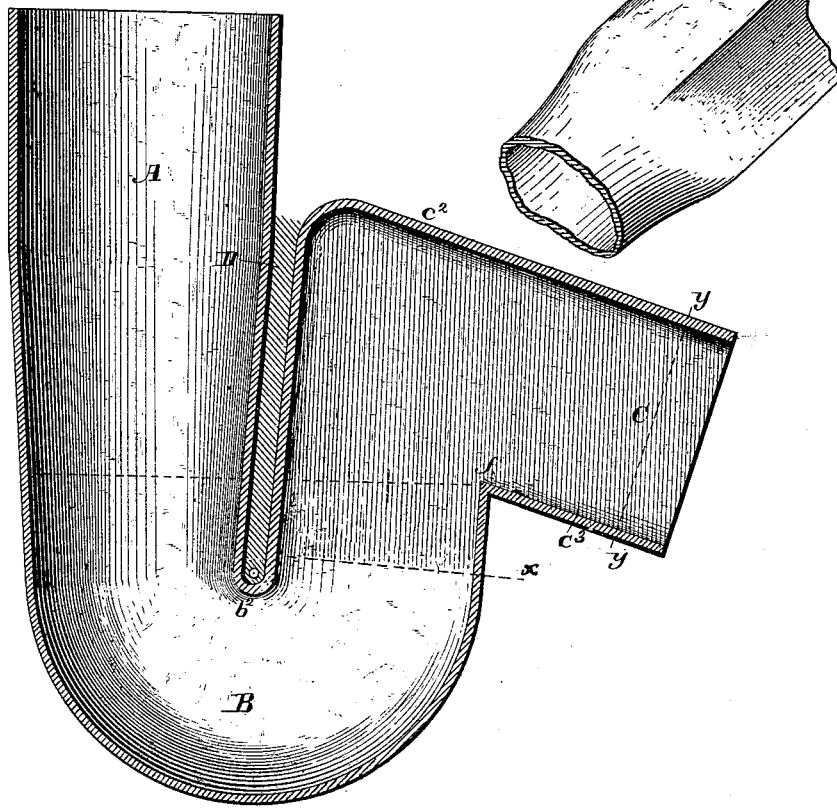
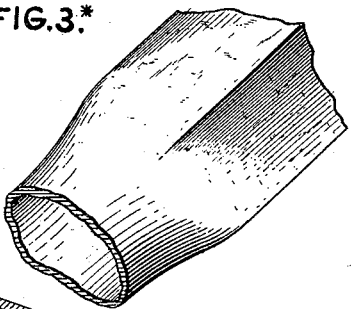
FIG.2.
FIG.3.
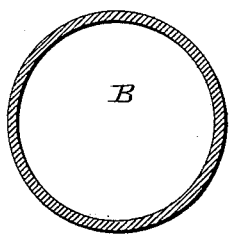
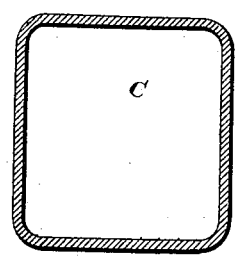
ATTEST.
J. Henry Kaiser.
Jacob Felbel.
INVENTOR.
Samuel S. Hellyer.
By J. N. McIntire
Atty.
N. PETERS, Photo-Lithographer, Washington, D. C.

(No Model.) 2 Sheets—Sheet 2.

S. S. HELLYER.
TRAP FOR SOIL AND OTHER PIPES.

No. 329,388. Patented Oct. 27, 1885.

ATTEST.
J. Henry Kaiser
Jacob Felbel

INVENTOR.
Samuel S. Hellyer
By J. N. McIntire
Atty.

UNITED STATES PATENT OFFICE.

SAMUEL S. HELLYER, OF LONDON, COUNTY OF MIDDLESEX, ENGLAND.

TRAP FOR SOIL AND OTHER PIPES.

SPECIFICATION forming part of Letters Patent No. 329,388, dated October 27, 1885.

Application filed October 10, 1884. Serial No. 145,185. (No model.)

*To all whom it may concern:*

Be it known that I, SAMUEL S. HELLYER, of London, in the county of Middlesex, England, have invented certain new and useful Improvements in Traps for Soil and other Pipes; and I do hereby declare that the following is a full, clear, and exact description thereof, reference being had to the accompanying drawings, making part of this application.

My invention relates to certain new and useful improvements in traps for soil and other waste pipes, and has for its main object to perfect or further improve on that form of such traps as is made the subject of another application for United States Letters Patent filed by me, and which is also seen in English Letters Patent No. 1,269, granted to me March 25, 1880. In this type or class of traps, as shown and described in my other application, and as heretofore used by me and patented in England, there exists certain kinds of defects or disadvantages which it is proposed to overcome by the improvements made the subject of this application; and to this end and object my present invention may be said to consist in certain novel features of construction, which will be hereinafter more fully explained, and which will be particularly pointed out and defined in the claims of this specification.

To enable those skilled in the art to make and use my invention, I will now proceed to more fully describe the same, referring by letters of reference to the accompanying drawings, which make part of this specification, and in which—

Figure 1 is a vertical longitudinal central section of a trap made according to my invention. Fig. 2 is a cross-section at the line $x\,x$ of Fig. 1. Fig. 3 is a cross-section at the line $y\,y$ of Fig. 1. Fig. 3* is a perspective view showing that portion of the upstand of the trap where the part circular in cross-section merges into the part square in cross-section; and Fig. 4 is a view similar to Fig. 1, but showing a modification in or modified form of the improved trap.

In the several figures the same part will be found designated by the same letter of reference.

A is the inlet-pipe or descending portion of the trap. B is the bowl-like portion or that part which contains the water-sealing, and C is the out-go or discharge pipe. By preference the inlet-pipe is slightly enlarged or tapered upwardly from the bowl portion to the top. The bowl-like portion B, like the inlet-pipe, is circular in cross-section all the way round to a point slightly below that at which the ascending part of the trap runs into the overflow or discharge pipe C. The dip $b^2$ is arranged so that the cross-sectional area of the trap immediately beneath the dip is slightly less than the cross-sectional area of the trap at the point or plane where it runs into the lower end of the inlet-pipe A, and about at the plane indicated by the line $x\,x$ the ascending portion of the trap-bowl is translated into a form which is about square in cross-section, which polygonal form in cross-section is maintained throughout the rest of the trap—that is, out to the end of the discharge-pipe or exit C. It will be observed that those portions of the inlet-pipe A and the ascending or upstand portion of the out-go which are nearest together run about parallel to each other, and that the narrow space between these adjacent portions is filled in with metal, as seen at D. This filling D serves to strengthen the structure, and is especially desirable in cases where the trap is made of thin cast-lead. The top part, $c^2$, of the trap and the exit-pipe C is not only made flat, as shown, but lies in a plane which forms an acute angle with the line of upstand portion of the trap, the object and advantage of which construction is that any column of water rushing suddenly upwardly in said upstand and striking against the top of the out-go C will not only have no tendency to follow the out-go pipe, but will in reality be deflected toward the inlet-pipe, and thus have a greater tendency to fall backwardly and downwardly when the momentum shall have ceased, and re-enter the bowl portion of the trap, thus insuring to a greater extent a perfect retention of the seal in said portion of the trap than would be likely to occur if the top part, $c^2$, of the out-go were inclined in an opposite direction or were even arranged at right angles to the upstand portion of the trap. The lower side or portion of the discharge portion C is, as shown at $c^3$, also inclined downwardly from the line of the upstand portion of the trap, the result of which form is that an acute angle is formed at the point $f$. This acute angle at this point renders the trap less liable to any escape of the water-seal by a waving overflow of the water, and is not only better than a curved shape at this point, but even better than a form such as shown in my other application. By having the cross-sectional area of the trap smaller at the point immediately below the dip the swabbing out of the bottom of the trap is more effectually accomplished by any rush of water through the trap, and by having the upstand translated (at about the line $x\, x$ or slightly above this point) from a form circular in cross-section to one about square and of greater area the ascending column of rushing water is more or less broken up, leaving air-spaces, so that all siphoning action or tendency is completely destroyed, and so that, even without any ventilating tube or aperture at the top of the trap, the improved contrivance herein shown and described will always maintain a perfect water-seal up to the highest level at which the bowl-like portion of the trap is capable of containing water. Of course greater or less variations may be made in the details of the structure shown and described without departing from the novel features which constitute the gist of my invention in the contrivance made the subject of this application.

At Fig. 4 is shown a modification of form in which, while the acute angle formed between the top of the out-go and the line of the upstand is about the same in degree to that shown in the preceding figures, said upstand is arranged in a perfectly-vertical position, and so that there is much less space between the upper part of the upstand and the inlet-pipe than there is between the lower part of the former and that part of the inlet-pipe which runs into the bowl of the trap.

In any form of my improved trap the usual screw cap or plug—such as seen at E, Fig. 4—may be employed for the purpose of conveniently getting at the interior of the bowl of the trap, if deemed expedient.

Having now so fully described the construction and operation of my improved trap that those skilled in the art can make and use the same, what I claim therein as new, and desire to secure by Letters Patent, is—

1. A trap having a flattened top, $c^2$, arranged at an angle of less than ninety degrees from the line of the upstand, whereby any suddenly-ascending column of water in the upstand of the trap will be deflected backwardly and downwardly, substantially as and for the purpose set forth.

2. A trap having the inlet and bowl-like portion translated from a form which is circular in cross-section into a form about square in cross-section and of greater area about at the locality where the bowl-like portion runs into the upstand or ascending portion of the trap, substantially as set forth.

In testimony whereof I have hereunto set my hand this 18th day of August, 1884.

SAMUEL S. HELLYER.

In presence of—
J. WATT,
JOHN DEAN,
    *Both of* 17 *Gracechurch St., London.*